Jan. 15, 1929.

O. C. KAVLE ET AL 1,698,953

GEAR FINISHING MACHINE

Filed Dec. 9, 1925  2 Sheets-Sheet 1

INVENTORS
Oscar C. Kavle and Lloyd W. Moulton
BY
Parsons & Bordell
ATTORNEYS.

Jan. 15, 1929.   1,698,953
O. C. KAVLE ET AL
GEAR FINISHING MACHINE
Filed Dec. 9, 1925   2 Sheets-Sheet 2
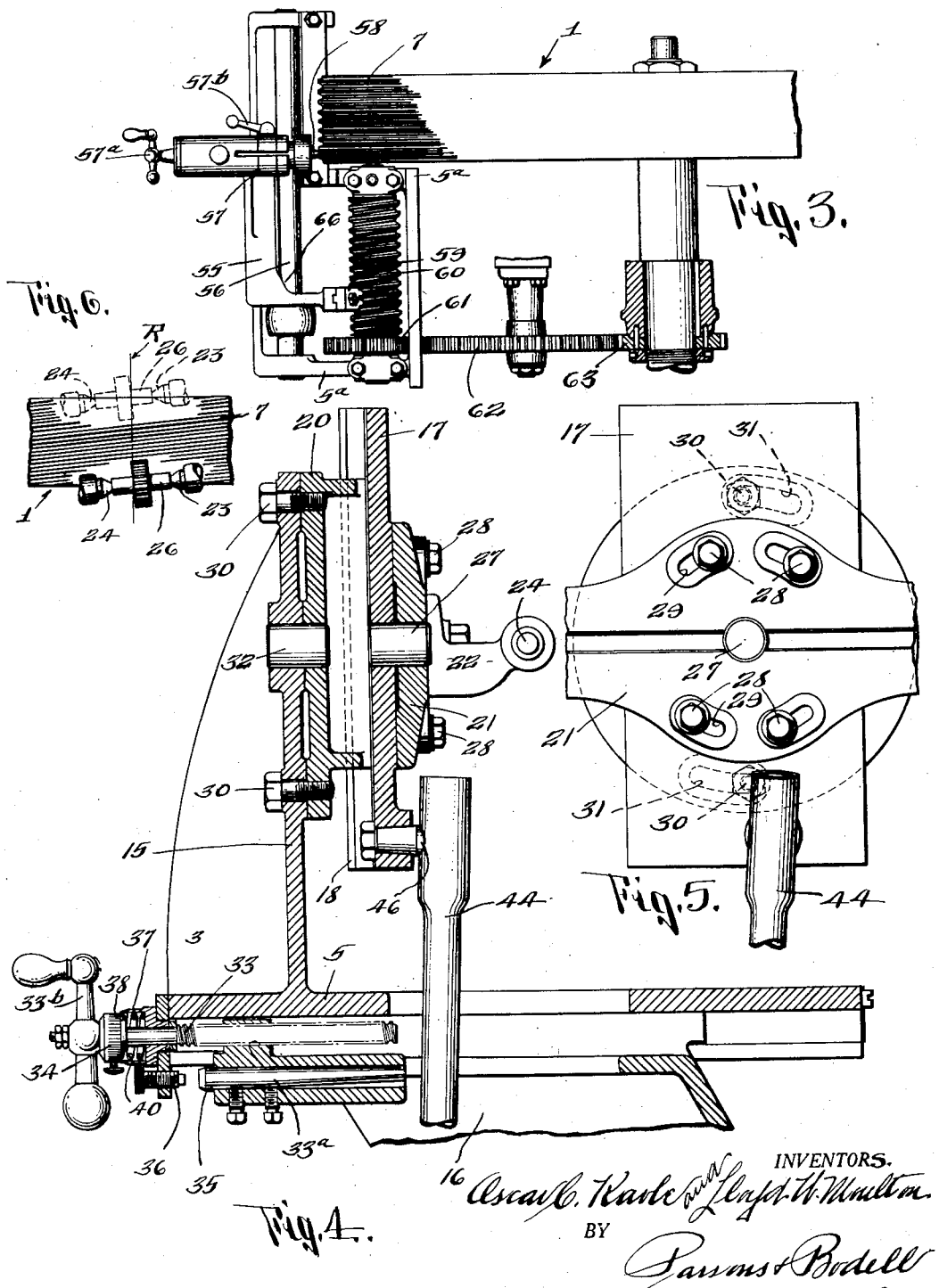
INVENTORS.
Oscar C. Kavle and Lloyd W. Moulton.
BY
Parsons & Bodell
ATTORNEYS.

Patented Jan. 15, 1929.

1,698,953

UNITED STATES PATENT OFFICE.

OSCAR C. KAVLE AND LLOYD W. MOULTON, OF SYRACUSE, NEW YORK, ASSIGNORS TO BROWN-LIPE GEAR COMPANY, OF SYRACUSE, NEW YORK, A CORPORATION OF NEW YORK.

GEAR-FINISHING MACHINE.

Application filed December 9, 1925. Serial No. 74,272.

This invention has for its object a machine for finishing, forming, generating, grinding, rectifying or lapping etc., the teeth of gears, gear blanks, or toothed blanks and analogous articles of various descriptions and has for its object a machine which is particularly simple in construction, and highly efficient and rapid in operation, and by which the toothed blank is automatically and continuously shifted while in engagement with the tooth former during the grinding, forming, lapping or other analogous operations so that such operations are continuous and not interrupted by indexing operations. Other objects appear throughout the specifications.

The invention consists in the novel features and in the combinations and constructions hereinafter set forth, and claimed.

In describing this invention reference is had to the accompanying drawings in which like characters designate corresponding parts in all the views.

Figure 3 is a fragmentary elevation of the master tooth former showing in detail the trimming mechanism.

Figure 4 is an enlarged vertical sectional view taken through the work carriage, and contiguous parts.

Figure 5 is a detail view of the parts seen in Figure 4, looking to the left in Figure 4.

Figure 6 is a diagrammatic, fragmentary view, of the working face of the master tooth former, showing the relative position of the gear blank, and the teeth of the tooth former at the start of each reciprocation, considering an up and down or a back and front movement as constituting a reciprocation.

Figures 1, 2:
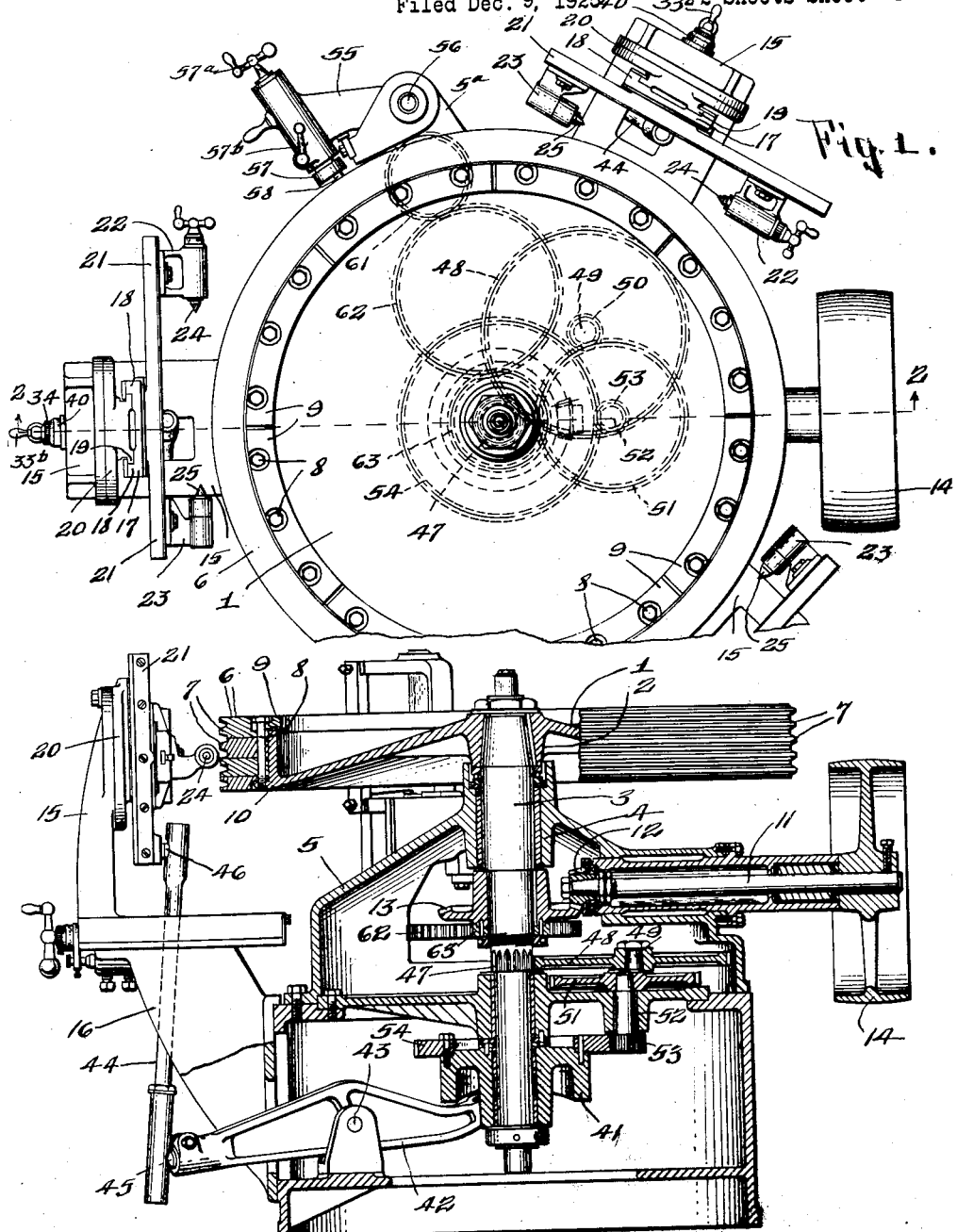
Figure 1 is a plan view of a preferable form of a machine embodying my invention.
Figure 2 is a sectional view partly in elevation, taken approximately on line 2—2, Figure 1.

This machine comprises, generally, a master tooth former having a working face formed with inclined teeth extending lengthwise of such face in contradistinction to crosswise thereof, a work carriage arranged to support a toothed blank, as a gear blank, with the teeth in mesh with those of the tooth former, and means for effecting relative movement of the work carriage and the tooth former in a direction of the teeth of the former, and also crosswise of such teeth at an inclined angle where the working face of the tooth former is formed, or cylindrical in order to relatively shift the work carriage and the tooth former bodily to bring all points of the teeth of the gear blank throughout the length thereof, to full depth in engagement with the teeth of the former. The relative lengthwise movement of the gear carriage and the working face or teeth of the former effects the grinding, forming, lapping, generating or analogous operation and also a continuous turning of the blank to bring all the teeth of the blank into engaging position without indexing the blank.

The transverse movement of the carriage, and the teeth of the tooth former at an inclined angle effects the lapping, grinding or finishing operations the full depth of the tooth, throughout the length of the tooth.

In the illustrated embodiment of our invention the tooth former is shown as movable about an axis, and rotatable about an upright axis, and as having a cylindrical working face provided with a master tooth or teeth extending circumferentially of such cylindrical working face, and the work carriage is shown as mounted to reciprocate vertically to carry the work as a gear blank transversely of the spiral tooth of the tooth former. The incline or lead of the tooth or teeth of the tooth former is thus slightly out of a horizontal plane, as the former is mounted to rotate about a vertical axis. The work carriage is provided with means for adjusting the work to the lead or angle of the spiral tooth of the tooth former, and also is adjustable to vary its angle of reciprocation so that all parts of the tooth face will be finished, lapped or otherwise operated on to a certain maximum depth, the angle being less, for short gears and greater having larger gears. The incline of the angle of reciprocations causes the blank to be shifted bodily relatively to the former lengthwise of the teeth of the tooth former or from one side to the other of a plane radial with the axis of the tooth former.

In the drawing 1 designates the tooth former, which is here shown as a wheel having a hub 2, suitably mounted upon an upright shaft 3, journaled in a bearing 4, in a suitable frame 5, the wheel 1 having annular sections 6 at its periphery which are formed with the spiral teeth 7, the teeth 7 of one section being continuous of those of the next section.

These sections 6 are secured on the wheel in any suitable manner, and are here shown as secured in position by clamping members or bolts 8 extending through the sections, and through a movable abutment 9, abutting against one of the outside sections, and threading into a fixed abutment 10, abutting against the other outside section. The teeth 7 are provided on sections, as the sections can be conveniently made, and assembled and also removed and replaced when worn. The shaft 3 is actuated by means of a drive shaft 11 suitably mounted in bearings in the frame 5, and having a beveled gear 12 at its inner end meshing with bevel gear 13 on the shaft 3. The shaft 11 is here shown as provided at its outer end with a pulley 14, for connection to any suitable source of power.

15, designates a support for the work carriage, this being in itself a main carriage mounted on a bracket 16 suitably carried by the frame and movable radially relatively to the axis of the master former 1 to carry the work toward and from the working face of the former. 17 is a reciprocating carriage having ways 18, movable along complemental ways 19 on a head 20 adjustable about a horizontal axis, relative to the main carriage or carriage support 15. The carriage 17 is provided with a work support 21 also adjustable about an axis to cause the toothed blank or gear blank to conform to the lead of the tooth or teeth 7 of the tooth former 1. This work support 21 has brackets 22—23 adjustable lengthwise thereof, and carrying spindles 24, 25, for holding the work or a mandrel as 26 on which the work is mounted. In case of stem gears, and the like the stem serves in place of the mandrel. As shown in Figures 4 and 5 the work support 21 is mounted on a central spindle 27, and is held at its adjusted position by clamping screws 28 extending through arc-shaped slots 29 concentric with the spindle 27 and threading into the carriage 17.

The head 20 which is formed with the ways for the carriage 17 is shown as secured to the main carriage or support 15 by similar screws or clamping members 30, extending through slots 31 arranged concentric with the spindle 32 on which the head is mounted and threading into the main carriage or support 15. The spindle 32 is alined with the spindle 27. By adjusting the head 30 about its axis, the angle of reciprocation of the carriage 17 can be adjusted to cause the teeth of the gear or blank to be acted on to full depth, the entire length of the tooth. Adjusting the work support 21 about the axis 27 arranges the gear so that its teeth are parallel to the teeth of the tooth former 1, that is so that the teeth of the gear conform to the lead angle of the teeth 7 of the tooth former 1.

The main carriage or work support is fed in and out toward the working face of the former by means of a feed screw 33, carried by the main carriage 15, and threading into a threaded passage 33ª carried by the frame, the screw, 33 having a suitable handle 33ᵇ at its outer end, and also having micrometer 34 associated therewith to assist the operator in feeding the carriage 15. The extent of the feeding movement is determined by a normally fixed stop 35, Figure 4 on the frame 5 or bracket 16 and an adjustable stop 36 on the carriage 15. Also for the purpose of taking up any lost motion due to looseness in the threads of the feed screw and the threaded passage 32, the thrust of the thread screw 31 is against the action of the compression spring 37, interposed between a shoulder 38 on the lead screw and a shoulder 39 on the carriage. This spring is here shown as located in a cup-shaped housing 40 and the bottom of the housing constitutes the shoulder 39. There are usually a plurality of work carriages all alike in construction and arrangement, spaced apart around the tooth former.

The means for reciprocating each carriage 17 may be of any suitable form, size and construction, and that here shown consists of motion transmitting means between the shaft 3 and the carriage 17.

This motion transmitting means comprises a cam 41 mounted concentric with the shaft 3, and connected thereto through any suitable means as a train of gearing, a cam follower coacting with the cam 41, and carried at the inner end of a lever 42, pivoted at 43, and a link 44 connected at one end at 45 to the outer end of the lever, and at its outer end at 46, to the carriage 17, the joints 45 and 46 being ball and socket joints.

The train of gears between the shaft 3 and the cam 41 is here shown as a pinion 47 formed on the shaft 3, and meshing with a gear 48, mounted on a spindle 49, which in turn has a pinion 50 thereon, meshing with the gear 51 mounted on a spindle 52 having pinion 52 thereon, which meshes with the gear 54 on the cam 41. Any other suitable train of gearing may be provided.

Means is provided for trimming the teeth 7 of the former, and this trimmer mechanism consists of a carriage 55. Figures 1 and 3 pivoted at 56 to a bracket 5ª carried by the frame 5, the bracket being formed with suitable ways along which the carriage 55 slides vertically. The carriage carries a tool holder 57 for supporting a tool 58, and has a follower 59 movable along a worm 60, suitably supported by the frame. The tool holder 57 is provided with suitable feeding means as a feed screw operated by a handle 57ª and the tool may be clamped in any adjusted position by a clamping member having a handle 57ᵇ.

The worm 60 is actuated preferably from the shaft 3, through any suitable motion transmitting mechanism, synchronizing the rotation of the tooth former and the worm. The mechanism here shown is a gear 61 on the worm meshing, with an intermediary 62, which meshing with a gear 63 on the shaft 3. In operation the tool holder carriage is swung to bring the tool 58 into engagement with the teeth 7 of the former, and at the same time brings the follower 59 into mesh with the worm 60. Thus during rotation of the worm, the carriage 55 is fed vertically, moving the tool 58 at a certain rate relatively to the teeth 7, thus trimming the teeth of the tooth former 1. At the end of the upward movement the tool holder is swung out of engagement with the teeth of the tooth former by an inclined face 66 thereon coming into contact with any face on the bracket 5ª.

In operation during the rotation of the tooth former 1 the gear blank, which has been set to the lead of the former teeth 7, is moved vertically, transversely of the working face of the tooth former 1, and owing to the incline of the guides or ways for the work carriage 17, the work is fed lengthwise of the teeth 7 more or less, in order to shift the gear from one side of a radial line designated R, Figure 6 to the other, so that the teeth of the gear blank will be formed, generated, ground, lapped or finished to a maximum depth throughout the length of the teeth of the gear. When the teeth of the former needs trimming the trimming tool carriage 55 is swung on its pivot to carry the follower 59 into mesh with the worm 60, and the tool 58 fed into the teeth 7 and locked; and as the worm 60 is rotated the tool will be moved upwardly along the teeth, until the cam face 66 shifts the carriage 55 on its pivot to carry the follower 60' out of mesh with the worm 60, and the tool 58 out of engagement with the teeth 57.

What we claim is:—

1. A machine of the character described comprising a master tooth former movable about an axis, and formed with spiral teeth extending around the axis thereof, a work carriage arranged to support a toothed article with the teeth in mesh with the spiral teeth of the former, and means for moving the tooth former about its axis and for effecting relative movement of the carriage and the tooth in directions crosswise of the spiral teeth of the tooth former at a right angle to the spiral teeth of the tooth former.

2. A machine of the character described comprising a master tooth former having a working face formed with inclined teeth extending lengthwise of such face; a work carriage having means for supporting a toothed blank with its teeth in mesh with the inclined teeth of the former, said means being adjustable to locate the blank with the teeth thereof parallel to and in mesh with the teeth of the tooth former, and means for reciprocating the carriage transversely of the working face of the tooth former.

3. A machine of the character described comprising a master tooth former having a working face formed with inclined teeth extending lengthwise of such face; a work carriage having means for supporting a toothed blank with its teeth in mesh with the inclined teeth of the former, said means being adjustable to locate the blank teeth with the teeth thereof parallel to and in mesh with the teeth of the tooth former, and means for reciprocating the carriage transversely of the working face of the tooth former, the carriage also having means for varying the angle of its reciprocating movement.

4. A machine of the character described comprising a frame, a master tooth former, carried by the frame, and having a working face formed with slightly inclined teeth extending lengthwise of such face, a support provided with a head formed with ways extending in a direction transversely of the teeth of the tooth former, a work carriage movable along the ways, and having means arranged to support a toothed blank with its teeth in mesh with those of the tooth former and means for reciprocating the work carriage, the work support being adjustable about an axis to arrange the blank with teeth thereof parallel to the teeth of the tooth former.

5. A machine of the character described comprising a rotatable tooth former having a cylindrical working face formed with spiral teeth extending circumferentially of such face, a carriage support having a head formed with ways extending in a direction transversely of the teeth of the tooth former, a work carriage movable along said ways, and having a work support arranged to carry a toothed blank with its teeth in mesh with the teeth of the former and means for reciprocating the work carriage.

6. A machine of the character described comprising a rotatable tooth former having a cylindrical working face formed with spiral teeth extending circumferentially of such face, a carriage support having a head formed with ways extending in a direction transversely of the teeth of the tooth former, a work carriage movable along said ways, and having a work support arranged to carry a toothed blank with its teeth in mesh with the teeth of the former, the work support being adjustable about an axis to arrange the gear blank with its teeth parallel to the teeth of the tooth former, and the head being adjustable about an axis to vary the angle of the reciprocating movement of the work carriage, and means for reciprocating the work carriage.

7. A machine of the character described, the combination of a master tooth former, a work carriage arranged to support a toothed blank with the teeth in mesh with those of the former, means for actuating the former, and means for feeding the work carriage to carry the work toward and from the former, comprising a manually operable feed screw, and a stop for limiting the movement of the carriage by the feed screw to conform to the depth of the tooth being formed.

8. A machine of the character described, comprising a tooth former having a working face formed with teeth, a work carriage arranged to support a toothed blank with the teeth in mesh with those of the tooth former, means for actuating the tooth former, and means for feeding the work carriage to carry the work toward and from the tooth former comprising a feed screw movable with the carriage, and a spring tending to thrust the screw endwise relatively to the carriage.

9. A machine of the character described, comprising a tooth former having a working face formed with teeth, a work carriage arranged to support a toothed blank with the teeth in mesh with those of the tooth former, means for actuating the tooth former, and means for feeding the work carriage to carry the work toward and from the tooth former comprising a feed screw movable with the carriage, and a spring tending to thrust the screw endwise relatively to the carriage, and stops for limiting the movement of the carriage by the feed screw to conform to the depth of the tooth being formed.

In testimony whereof, we have hereunto signed our names, at Syracuse, in the county of Onondaga, and in the State of New York, this 3rd day of Dec., 1925.

OSCAR C. KAVLE.
LLOYD W. MOULTON.